US011852307B1

(12) United States Patent
Lin et al.

(10) Patent No.: US 11,852,307 B1
(45) Date of Patent: Dec. 26, 2023

(54) HEADLIGHT

(71) Applicant: Young Optics Inc., Hsinchu (TW)

(72) Inventors: Ching-Lun Lin, Hsinchu (TW); Jyh-Horng Shyu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 18/078,060

(22) Filed: Dec. 8, 2022

(51) Int. Cl.
*G02B 5/02* (2006.01)
*F21S 41/176* (2018.01)
*F21S 41/16* (2018.01)
*F21S 41/32* (2018.01)
*F21S 41/25* (2018.01)

(52) U.S. Cl.
CPC ............. *F21S 41/176* (2018.01); *F21S 41/16* (2018.01); *F21S 41/25* (2018.01); *F21S 41/32* (2018.01)

(58) Field of Classification Search
CPC .......... F21S 41/176; F21S 41/16; F21S 41/25; F21S 41/32
See application file for complete search history.

(56) References Cited

U.S. PATENT DOCUMENTS

2020/0301266 A1* 9/2020 Nakamura ........... G02B 26/008
2021/0301997 A1* 9/2021 Regensburger ....... F21S 41/663
2021/0302232 A1 9/2021 Goldring et al.
2021/0389652 A1* 12/2021 Takano .................. G02B 13/18
2022/0045245 A1 2/2022 Basin et al.
2022/0066306 A1 3/2022 Uehara
2023/0244008 A1* 8/2023 Chung ................. G02B 5/0231 359/756

FOREIGN PATENT DOCUMENTS

CN 102466954 4/2015

* cited by examiner

*Primary Examiner* — Elmito Breval
(74) *Attorney, Agent, or Firm* — JCIPRNET

(57) ABSTRACT

A headlight using an image light source is provided, which includes a laser light source and a wavelength converter. The laser light source includes multiple light-emitting units arranged in an array to provide an image beam. The wavelength converter is arranged downstream of an optical path of the laser light source. The wavelength converter is provided with a light dot matrix with the number of rows and columns greater than or equal to 40×40 to excite a part of the image beam into an excitation beam, and an unexcited part of the image beam is mixed with the excitation beam to generate a white beam.

18 Claims, 5 Drawing Sheets

HEADLIGHT

BACKGROUND

Technical Field

The disclosure relates to a lighting device, and particularly relates to a headlight using an image light source.

Description of Related Art

For the purpose of driving safety, there are certain normative requirements for the brightness and light field distribution of lighting of vehicle headlights. General light sources, whether halogen lamps, metal lamps or LED lamps, cannot be directly projected, and the light field needs to be changed in order to meet the lighting requirements of vehicle headlights.

At present, vehicle headlight projection technologies can be divided into three types, including: light-emitting diodes with optical elements and light valves; micro-light-emitting diodes; and scanning lasers with fluorescent excitation plates. However, a system using light-emitting diodes with optical elements and light valves will increase the size and raise the cost due to additional components. A system using micro-light-emitting diodes may have a problem of low yield. A system using scanning lasers with fluorescent excitation plates also requires additional components, which increases the size.

SUMMARY

The disclosure provides a headlight using an image light source, which reduces the size and lowers the cost.

The disclosure provides a headlight using an image light source, including a laser light source and a wavelength converter. The laser light source includes light-emitting units arranged in an array to provide an image beam. The wavelength converter is arranged downstream of an optical path of the laser light source. The wavelength converter is provided with a light dot matrix with the number of rows and columns greater than or equal to 40×40 to cause a part of the image beam to be excited into an excitation beam and an unexcited part of the image beam to be mixed with the excitation beam to generate a white beam.

The disclosure further provides a headlight using an image light source, including a laser light source and a wavelength converter. The laser light source includes light-emitting units arranged in rows to provide dot beams arranged in rows. The wavelength converter is arranged downstream of an optical path of the laser light source to cause the dot beams to generate an excitation beam and the excitation beam to be mixed with an unexcited beam to generate a white beam. The number of rows and columns of a light dot matrix on the wavelength converter is greater than or equal to 40×40.

In an embodiment of the disclosure, the headlight further includes a controller electrically connected to the laser light source to individually control light intensities of the light-emitting units.

In an embodiment of the disclosure, the wavelength converter is a phosphor.

In an embodiment of the disclosure, a density of the light dot matrix on the wavelength converter is greater than or equal to 400 laser dots per square millimeter.

In an embodiment of the disclosure, the headlight further includes an optical lens group arranged downstream of the optical path of the laser light source and located between the laser light source and the wavelength converter.

In an embodiment of the disclosure, the headlight further includes a heat dissipation element disposed on the wavelength converter.

In an embodiment of the disclosure, the optical lens group includes a reflective mirror to reflect the image beam to the wavelength converter.

In an embodiment of the disclosure, the wavelength converter includes a wavelength conversion material, a driving element, and a turntable. The wavelength conversion material is disposed on the turntable, and the driving element rotates the turntable around a rotation axis.

Based on the above, the headlight according to the disclosure is provided with the laser light source arranged in an array and the wavelength converter. When the laser light source provides the image beam to the wavelength converter, the image beam is excited to subsequently generate the white beam. Specifically, the number of rows and columns of the light dot matrix formed by the image beam of the laser light source on the wavelength converter is greater than or equal to 40×40. Thus, no additional light valves or other optical elements need to be configured, so the size can be reduced and the cost can be lowered. In addition, when compared with a vehicle lamp using light-emitting diodes as the light source, this embodiment uses laser as the light source which has better optical effects.

In order to make the above-mentioned and other features and advantages of the disclosure more comprehensible, exemplary embodiments are described in detail hereinafter with reference to the accompanying drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
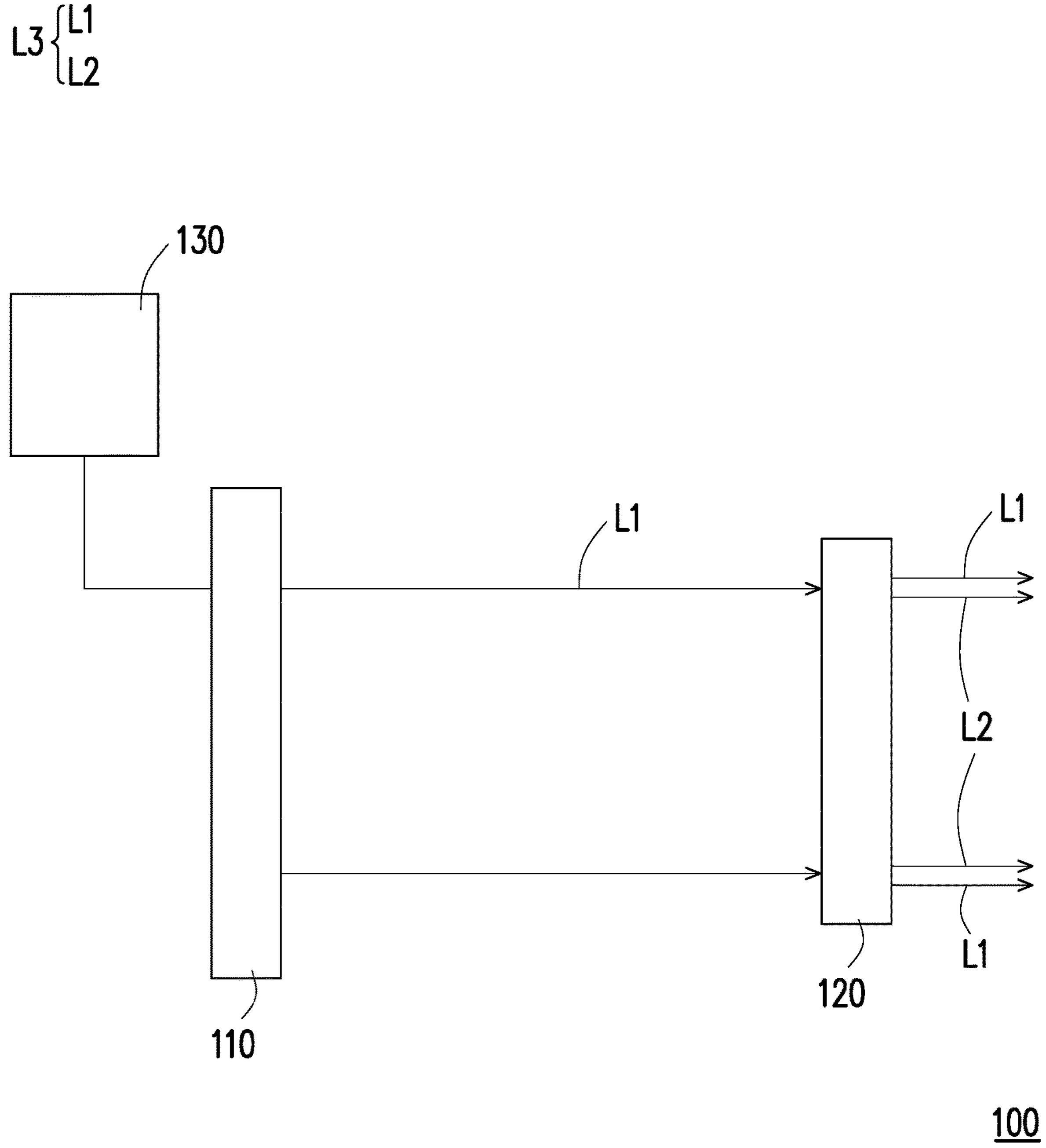
FIG. 1 is a schematic side view of the headlight according to an embodiment of the disclosure.

FIG. 1 is a schematic side view of a headlight according to an embodiment of the disclosure. Referring to FIG. 1, this embodiment provides a headlight 100 using an image light source, which is assembled in a vehicle to provide lighting. The headlight 100 includes a laser light source 110 and a wavelength converter 120. In detail, in this embodiment, the headlight 100 further includes a controller 130 and a projection lens (not shown), but the disclosure is not limited thereto.

Figure 2:
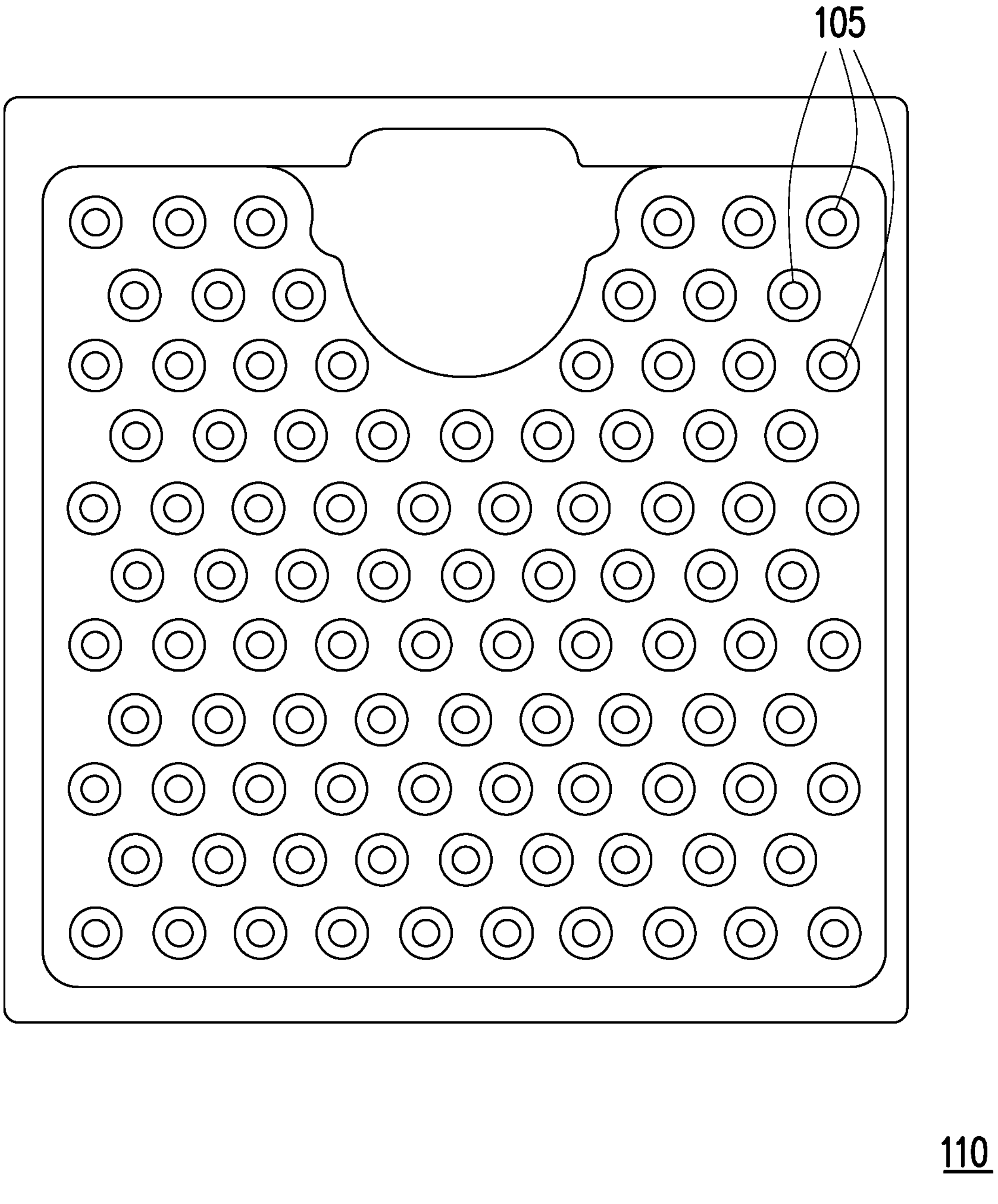
FIG. 2 is a schematic front view of the laser light source in the headlight of FIG. 1.

FIG. 2 is a schematic front view of the laser light source in the headlight of FIG. 1. Referring to FIG. 1 and FIG. 2, for convenience, the light-emitting units 105 shown in FIG. 2 are only for illustrative purposes. The laser light source 110 includes a plurality of light-emitting units 105 arranged in an array to provide an image beam L1. In this embodiment, the light-emitting units 105 are vertical-cavity surface-emitting lasers (VCSEL) and are arranged in an array, and the beams provided by these light-emitting units 105 are combined into the image beam L1. For example, the light-emitting units 105 are arranged in a matrix greater than or equal to 40×40, or it can be said that the light-emitting units 105 are arranged in multiple rows and provide a plurality of dot beams arranged in multiple rows. In this embodiment, the wavelength band of the image beam L1 is, for example, blue.

Reverting to FIG. 1, the wavelength converter 120 is arranged downstream of the optical path of the laser light source 110 (that is, arranged on the transmission path of the image beam L1) to excite the image beam L1 and subsequently generate a white beam L3. In this embodiment, the wavelength converter 120 is a phosphor and is a transmissive optical element, and is in the shape of a plate (or called a wavelength conversion plate). In detail, the phosphor includes a fluorescent layer, which may be made of glue, glass or ceramic, but the disclosure is not limited thereto. When the image beam L1 is irradiated toward the wavelength converter 120 by the laser light source 110, a part of the image beam L1 is excited by the fluorescent material on the fluorescent layer to generate an excitation beam L2 with a different wavelength. Further, another part of the image beam L1 is transmitted to a laser layer without being excited by the fluorescent material on the fluorescent layer, so the another part of the image beam L1 directly passes through the wavelength converter 120. In other words, in this embodiment, a part of the image beam L1 that passes through the wavelength converter 120 (that is, the unexcited part) is mixed with the excitation beam L2 excited by the wavelength converter 120 to form a white beam L3, which can be formed by mixing the blue image beam L1 with the yellow excitation beam L2 in a specific ratio.

In addition, in this embodiment, since the light-emitting units 105 are arranged in a matrix greater than or equal to 40×40, the number of rows and columns of the light dot matrix on the wavelength converter 120 is greater than or equal to 40×40. In an exemplary embodiment, the density of the light dot matrix on the wavelength converter 120 is greater than or equal to 400 laser dots per square millimeter. Thus, with the configuration of the laser light source 110 and the wavelength converter 120, the headlight 100 of this embodiment does not require additional light valves or other optical elements, so the size can be reduced and the cost can be lowered. In addition, compared with a vehicle lamp using light-emitting diodes as the light source, this embodiment uses laser as the light source which has better optical effects.

It is worth mentioning that, in this embodiment, the headlight 100 further includes a controller 130 electrically connected to the laser light source 110 to individually control the light intensities of the light-emitting units 105. The controller 130 is, for example, a central processing unit (CPU), or other programmable general-purpose or special-purpose microprocessors, digital signal processors (DSP), programmable controllers, application specific integrated circuits (ASIC), other similar components or combinations thereof, but the disclosure is not limited thereto. In other words, the light-emitting units 105 arranged in an array can be controlled by the controller 130 so as to turn on, turn off, and adjust the gray scale of each light-emitting unit 105, thereby generating different light intensities and forming the image beam L1 with grayscale characteristics or patterns for application in different situations.

In this embodiment, the headlight 100 further includes a projection lens (not shown) which is arranged downstream of the optical path of the wavelength converter 120 (that is, arranged on the transmission path of the white beam L3) to project the white beam L3 out of the headlight 100 to a projection target (not shown) such as a road or a physical object. The projection lens includes one or a combination of multiple optical lenses with refractive power, for example, various combinations of non-planar lenses such as biconcave lenses, biconvex lenses, concave-convex lenses, convex-concave lenses, plano-convex lenses, and plano-concave lenses. The disclosure is not intended to limit the form and type of the projection lens.

Figure 3:
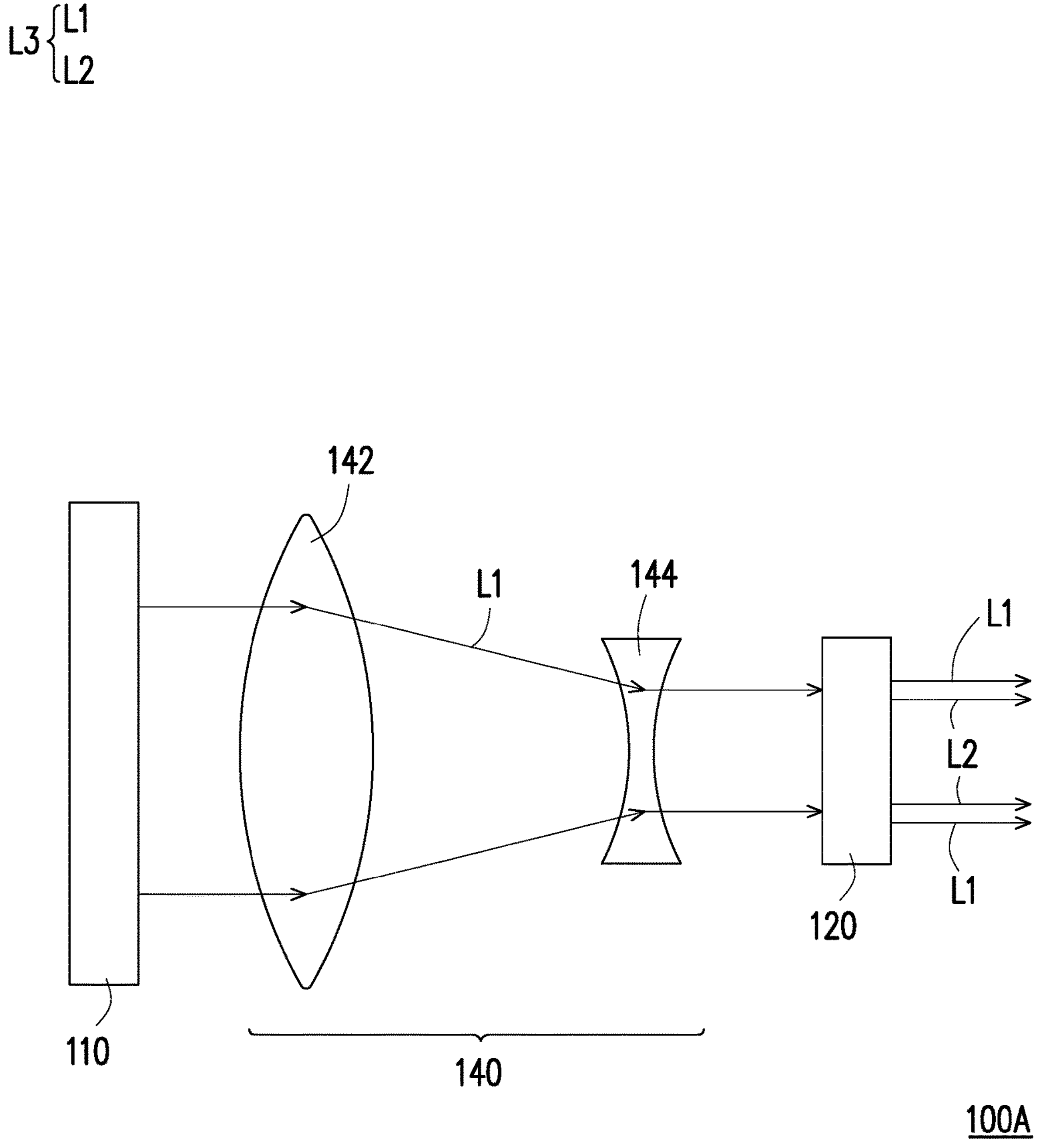
FIG. 3 is a schematic side view of the headlight according to another embodiment of the disclosure.

FIG. 3 is a schematic side view of the headlight according to another embodiment of the disclosure. Referring to FIG. 3, the headlight 100A of this embodiment is similar to the headlight 100 shown in FIG. 1. The difference between them is that, in this embodiment, the headlight 100A further includes an optical lens group 140 arranged downstream of the optical path of the laser light source 110 (that is, on the transmission path of the image beam L1 from the laser light source 110) and located between the laser light source 110 and the wavelength converter 120. The optical lens group 140 includes one or a combination of multiple optical lenses with refractive power, for example, various combinations of non-planar lenses such as biconcave lenses, biconvex lenses, concave-convex lenses, convex-concave lenses, plano-convex lenses, and plano-concave lenses, but the disclosure is not limited thereto. For example, in this embodiment, the optical lens group 140 includes a biconvex lens 142 and a biconcave lens 144 to converge the image beam L1. Therefore, the equivalent light-emitting area of the laser light source 110 can be further increased to improve the heat dissipation effect of the laser light source 110. Alternatively, the number of the light-emitting units 105 arranged in the laser light source 110 can be increased, but the disclosure is not limited thereto.

Figure 4:
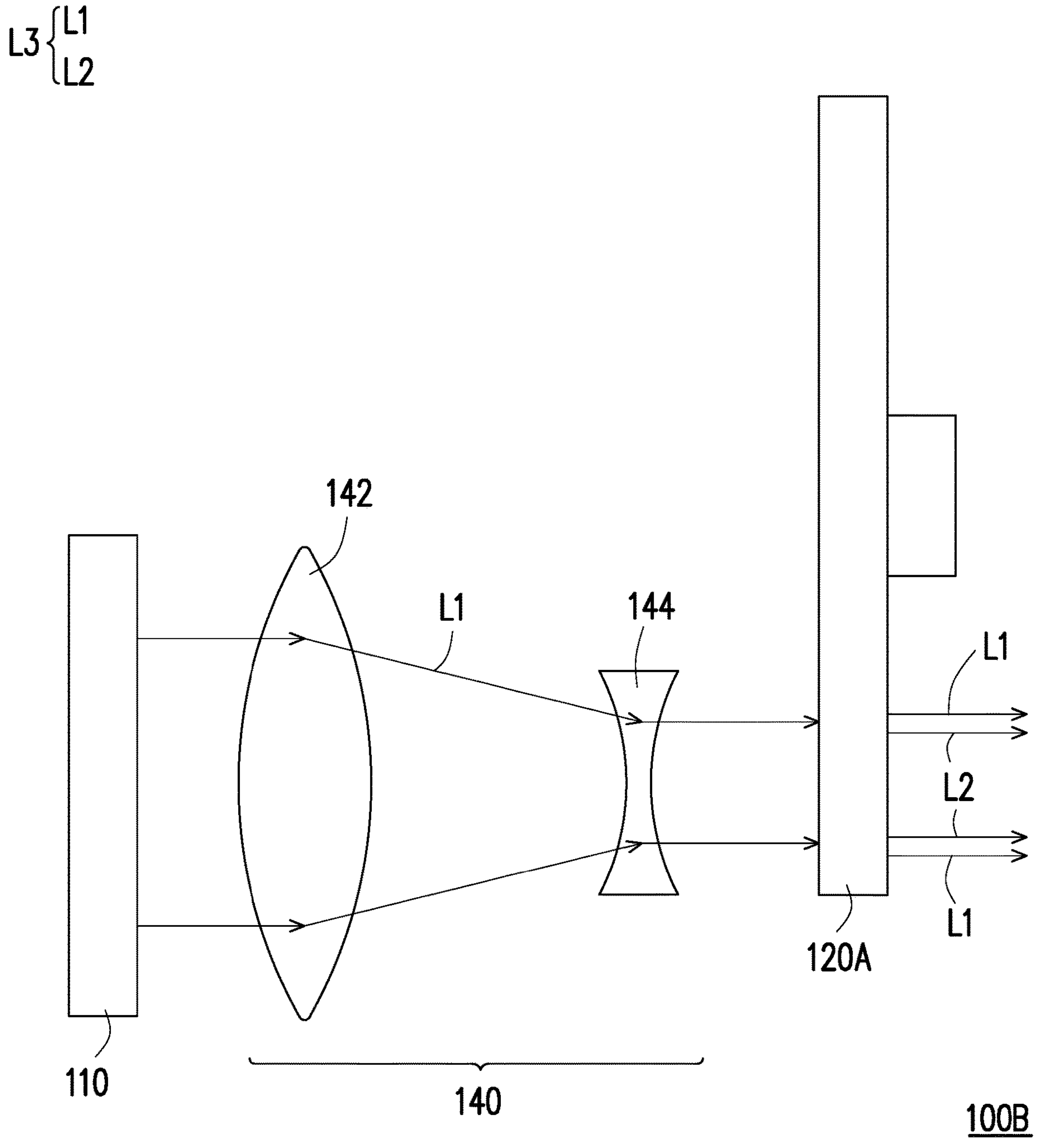
FIG. 4 is a schematic side view of the headlight according to another embodiment of the disclosure.

FIG. 4 is a schematic side view of the headlight according to another embodiment of the disclosure. Referring to FIG. 4, the headlight 100B of this embodiment is similar to the headlight 100A shown in FIG. 3. The difference between them is that, in this embodiment, the wavelength converter 120A includes a wavelength conversion material, a driving element, and a turntable. The wavelength conversion material is disposed on the turntable, and the driving element rotates the turntable around a rotation axis. For example, in this embodiment, the wavelength converter 120A is a rotatable color wheel device, the turntable is a disc carrying the wavelength conversion material, and the driving element may be, for example, a motor. Therefore, by rotating the wavelength converter 120A, the time for the image beam L1 to stay at the same position on the wavelength conversion material can be reduced to improve the heat dissipation effect of the wavelength converter 120A. In different embodiments, the wavelength converter 120A may be a transmissive type or a reflective type, but the disclosure is not limited thereto.

Figure 5:
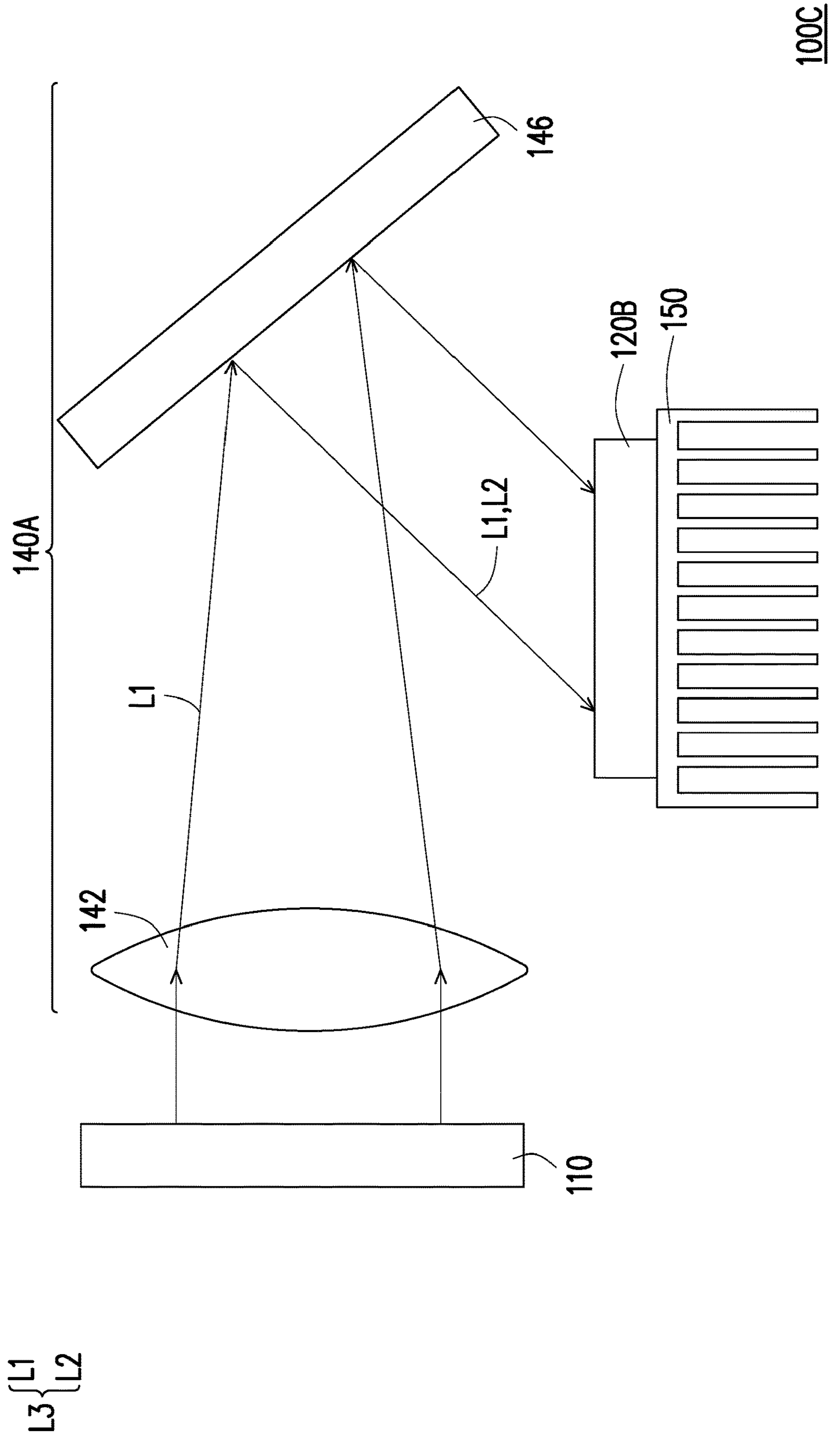
FIG. 5 is a schematic side view of the headlight according to another embodiment of the disclosure.

FIG. 5 is a schematic side view of the headlight according to another embodiment of the disclosure. Referring to FIG. 5, the headlight 100C of this embodiment is similar to the headlight 100A shown in FIG. 3. The difference between them is that the optical lens group 140A includes a biconvex lens 142 and a reflective mirror 146 to converge and reflect the image beam L1 to the wavelength converter 120B. In addition, in this embodiment, the headlight 100C further includes a heat dissipation element 150 disposed on the wavelength converter 120B. In other words, in the embodiment with this configuration, the position of the wavelength converter 120B can be further adjusted and an additional heat dissipation device can be disposed to improve the heat dissipation effect of the wavelength converter 120B.

To sum up, the headlight according to the disclosure is provided with the laser light source arranged in an array and the wavelength converter. When the laser light source provides the image beam to the wavelength converter, the image beam is excited to subsequently generate the white beam. Specifically, the number of rows and columns of the light dot matrix formed by the image beam of the laser light source on the wavelength converter is greater than or equal to 40×40. Thus, no additional light valves or other optical elements need to be configured, and the size can be reduced and the cost can be lowered. In addition, when compared with a vehicle lamp using light-emitting diodes as the light source, this embodiment uses laser as the light source which has better optical effects.

Although the disclosure has been described with reference to the embodiments above, they are not intended to limit the disclosure. Those skilled in the art may make changes and modifications without departing from the spirit and scope of the disclosure. Therefore, the scope of protection of the disclosure should be defined by the following claims.

What is claimed is:

1. A headlight using an image light source, comprising:
- a laser light source comprising light-emitting units arranged in an array to provide an image beam; and
- a wavelength converter arranged downstream of an optical path of the laser light source, wherein the wavelength converter is provided with a light dot matrix with the number of rows and columns greater than or equal to 40×40 to cause a part of the image beam to be excited into an excitation beam and an unexcited part of the image beam to be mixed with the excitation beam to generate a white beam.

2. The headlight according to claim 1, wherein the light-emitting units are vertical-cavity surface-emitting lasers.

3. The headlight according to claim 1, further comprising:
- a controller electrically connected to the laser light source to individually control light intensities of the light-emitting units.

4. The headlight according to claim 1, wherein the wavelength converter is a phosphor.

5. The headlight according to claim 1, wherein a density of the light dot matrix on the wavelength converter is greater than or equal to 400 laser dots per square millimeter.

6. The headlight according to claim 1, further comprising:
- an optical lens group arranged downstream of the optical path of the laser light source and located between the laser light source and the wavelength converter.

7. The headlight according to claim 6, further comprising:
- a heat dissipation element disposed on the wavelength converter.

8. The headlight according to claim 6, wherein the optical lens group comprises a reflective mirror to reflect the image beam to the wavelength converter.

9. The headlight according to claim 1, wherein the wavelength converter comprises a wavelength conversion material, a driving element, and a turntable, wherein the wavelength conversion material is disposed on the turntable, and the driving element rotates the turntable around a rotation axis.

10. A headlight using an image light source, comprising:
- a laser light source comprising light-emitting units arranged in rows to provide dot beams arranged in rows; and
- a wavelength converter arranged downstream of an optical path of the laser light source to cause the dot beams to generate an excitation beam and the excitation beam to be mixed with an unexcited beam to generate a white beam, wherein the number of rows and columns of a light dot matrix on the wavelength converter is greater than or equal to 40×40.

11. The headlight according to claim 10, wherein the light-emitting units are vertical-cavity surface-emitting lasers.

12. The headlight according to claim 10, further comprising:
- a controller electrically connected to the laser light source to individually control light intensities of the light-emitting units.

13. The headlight according to claim 10, wherein the wavelength converter is a phosphor.

14. The headlight according to claim 10, wherein a density of the light dot matrix on the wavelength converter is greater than or equal to 400 laser dots per square millimeter.

15. The headlight according to claim 10, further comprising:
- an optical lens group arranged downstream of the optical path of the laser light source and located between the laser light source and the wavelength converter.

16. The headlight according to claim 15, further comprising:
- a heat dissipation element disposed on the wavelength converter.

17. The headlight according to claim 15, wherein the optical lens group comprises a reflective mirror to reflect the image beam to the wavelength converter.

18. The headlight according to claim 10, wherein the wavelength converter comprises a wavelength conversion material, a driving element, and a turntable, wherein the wavelength conversion material is disposed on the turntable, and the driving element rotates the turntable around a rotation axis.

* * * * *